Patented Aug. 9, 1932

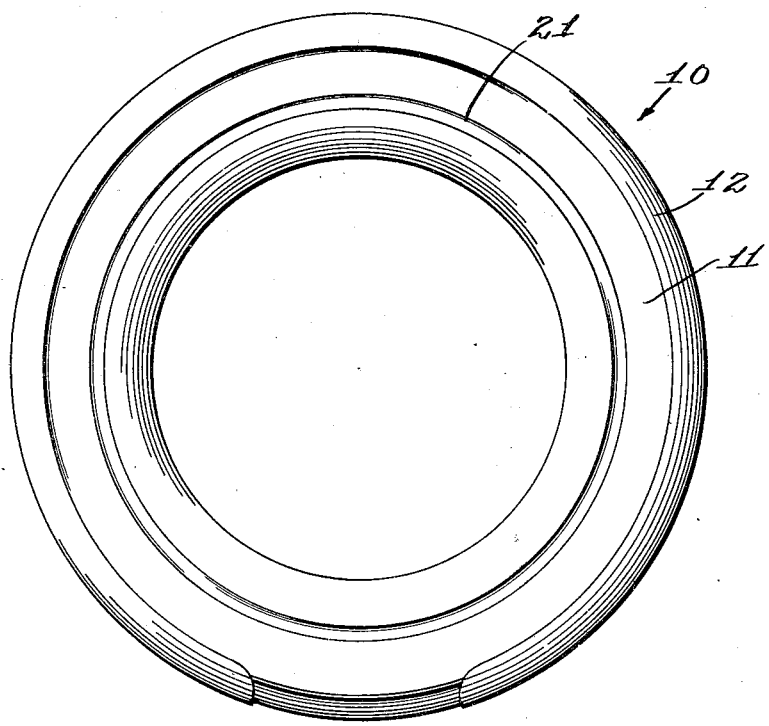
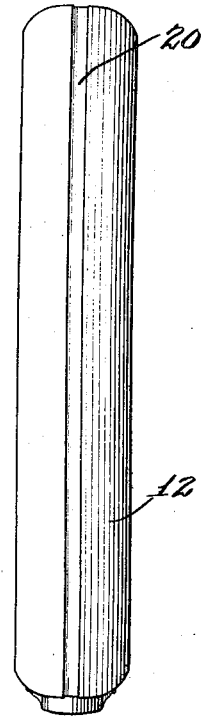
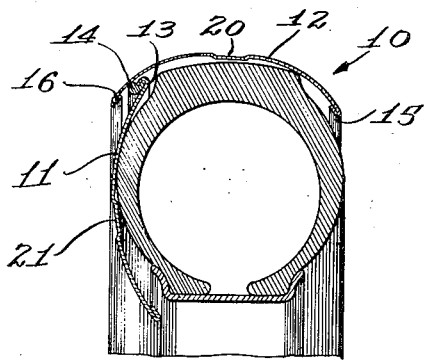
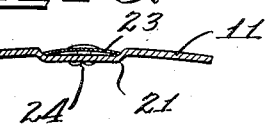

1,871,188

UNITED STATES PATENT OFFICE

GEORGE ALBERT LYON, OF ALLENHURST, NEW JERSEY, ASSIGNOR TO LYON INCORPORATED, OF ASBURY PARK, NEW JERSEY, A CORPORATION OF DELAWARE

TIRE COVER WITH PERIPHERAL STIFFENING MEANS

Application filed April 1, 1931. Serial No. 526,881.

This invention relates to tire protective covers and more particularly to an improved cover for a spare tire on a motor vehicle.

The object of this invention is to provide an improved tire cover of the same general character as that disclosed in my copending patent application Serial No. 327,552, filed December 21, 1928, and more particularly to provide a cover of that character with a peripheral stiffening means which not only serves to strengthen the tire cover but also greatly enhances its appearance.

It is to be noted that the present subject matter has in part been taken from my copending application Serial No. 279,292, filed May 21, 1928, and is hence continuational thereof.

In accordance with the general features of my invention there is provided a multi-part tire cover including a side plate for disposition over a side of the tire and a substantially circular rim formed to extend about the periphery of the tire, each or either of these two parts being provided with a peripheral depression for enabling strengthening of the tire cover and for at the same time enhancing the outward appearance of the tire cover.

Other objects and features of my invention will more fully appear from the following detailed description taken in connection with the accompanying drawing which illustrate several embodiments thereof, and in which:

Figure 1 is a side view of a tire showing my cover applied thereto;

Figure 2 is an end view of the structure shown in Figure 1;

Figure 3 is a fragmentary cross sectional view taken through a portion of Figure 1 showing the arrangement of the cover on the tire;

Figure 4 is a fragmentary enlarged sectional view of a modified form of tire cover showing the depressed portion therein for strengthening the cover and also having a circular strip disposed in the depression; and Figure 5 is a view similar to Figure 4 illustrating how the strip would be applied in a depression in the side plate part of the tire cover.

In the drawing the reference numeral 10 designates generally a tire cover which in the form illustrated on the drawings comprises two parts, namely, a side plate 11 and a split rim 12. This form of tire cover is of the same type as disclosed in my copending patent application previously referred to.

The side plate 11 is annular in shape and has a curved cross section formed to conform with the contour of a side of a given tire to which the cover is to be applied. The outer peripheral margin of this side plate is provided with a curved bead portion 13 in which is fitted a ring of rubber or other flexible material 14 adapted to engage the inner surface of the split rim 12 as shown in Figure 3.

The split rim 12 is substantially circular and is formed to extend about the periphery of the tire and has an inherent resiliency tending toward and capable of contracting the rim to a diameter less than the normal outer diameter of the tire so as to enable it to tightly hug the outer periphery of the tire to which it is applied. The rim and plate are so proportioned to each other that when the rim is on the tire one side of the rim is in holding engagement with the plate.

The bead or ring of flexible material 14 not only serves as a cushioning means but also acts as an anti-rattling device. That is to say, this ring of rubber prevents rattling of the two parts of the cover.

Furthermore it is to be noted that the split rim 12 has one of its peripheral edges or marginal portions, namely, that edge or portion which is adapted to be disposed on the inner side of the spare tire on a motor vehicle formed somewhat longer than the front marginal portion of the rim. This rear marginal portion is provided with a turned back edge 15 and the front marginal portion of the rim is provided with a turned back edge 16.

Needless to say it is, of course, understood that the improvement which I am now to describe although illustrated as being applied to a form of cover embodying two parts of my own invention is not necessarily limited in its application to that type of cover, since obviously it could be applied with equal advantage to other forms of tire cover.

Now in accordance with the improvement constituting the present invention, I provide either the rim or plate or both of them with an annular depression for not only strengthening either or both of these parts but also for providing a recess in which decorative matter may be disposed to enhance the appearance of the tire cover.

In Figure 2 the split rim 12 is provided with an annular depressed strip 20 which is so disposed that the median plane of the tire and cover passes therethrough. This depression may have applied therein any suitable decorative matter as for example a strip of enamel which greatly enhances the appearance of the cover. Then, too, the depressing of this portion 20 in the rim 12 strengthens the rim through its transverse cross section.

Similarly the plate 11 may be provided with an annular depression 21 in which suitable decorative matter such for example as a strip of enamel may also be disposed. This depressed portion 21 also strengthens the side plate to its transverse cross section and augments the appearance of the cover. If it is so desired, this depression may be disposed substantially centrally of the plate.

In Figure 4 I have illustrated the depressed portion 20 in the rim 12 as having applied therein a strip of metal 22 having a bowed cross section and which may be chromium plated if the same is desired. This strip if it is so desired may be stretched in place in the depression and anchored at its ends to the ends of the split rim 12. If the strip 22 is made of springy steel such as that used in a Farrant rapid rule the strip upon stretching will assume a curved cross section having a curvature not as great as its original form whereby the marginal portions of the strip are caused to bite into the sides of the depressed portion 20 in the rim 12 thus firmly anchoring the strip throughout its circumference to the depression in the rim.

In Figure 5 I have illustrated the depression 21 in the side plate 11 as having disposed therein a ring of sheet metal which may have any suitable decorative matter thereon or which like the strip 22 may if it is so desired be chromium plated. This ring of metal is designated by the reference numeral 23 and is suitably secured to the side plate 11 by any well known means, such for example as the rivet 24 or by welding.

The advantages of my present improvement in tire covers may be summed up briefly as follows:

1. The depressed portion necessarily increases the transverse rigidity of the cover parts or part;
2. The depressed portion provides a pocket for accommodating decorative matter;
3. The depressed portion renders decorative matter inaccessible for removal or substantially so;
4. The depressed portion facilitates manufacture of tire cover with such decorative matter;
5. The depressed portion materially enhances the appearance of cover;
6. The depressed portion precludes the presence of sharp edges such as would occur if a strip of decorative metal was applied directly to the outermost surface of the cover part or parts;
7. The depressed portion enable centralization of the strip with reference to the tire both transversely and circumferentially; and
8. The depressed portion enables a decorative metallic strip to be sprung in place therein and further enables a two point contact to be established between the strip and the side walls defining the depression whereby the strip is properly secured in place.

Now I desire it understood that although I have illustrated and described in detail the preferred embodiment of my invention, the invention is not to be thus limited but only insofar as defined by the scope and spirit of the appended claim.

I claim as my invention:

In a tire cover, a split part constructed of thin resilient metallic material and the transverse cross section thereof being interiorly concave, said part being circumferentially arcuate throughout substantially more than 180° and to such an extent that the ends of the arcuate part hug under the tire to pull down the major portion of the cover part on the tire, the major portion of the surface on each side of the median portion of said part being circumferentially relatively smooth, the median portion having a ridge-like deformation in a circumferential direction throughout the major circumferential length of the cover part to rigidly and strengthen that portion of said part.

In testimony whereof I have hereunto subscribed my name at Chicago, Cook County, Illinois.

GEORGE ALBERT LYON.

CERTIFICATE OF CORRECTION.

Patent No. 1,871,188.                        August 9, 1932.

GEORGE ALBERT LYON.

It is hereby certified that error appears in the printed specification of the above numbered patent requiring correction as follows: Page 2, line 75, for "enable" read enables, and in the claim, line 105, for "rigidly" read rigidify; and that the said Letters Patent should be read with these corrections therein that the same may conform to the record of the case in the Patent Office.

Signed and sealed this 11th day of October, A. D. 1932.

(Seal)                                                        M. J. Moore,
Acting Commissioner of Patents.